(12) United States Patent
Uchida

(10) Patent No.: US 8,495,756 B2
(45) Date of Patent: Jul. 23, 2013

(54) INFORMATION PROCESSING APPARATUS INCLUDING LOCKING FUNCTION, LOCKING (UNLOCKING) METHOD FOR INFORMATION PROCESSING APPARATUS AND PROGRAM THEREOF

(75) Inventor: Kaoru Uchida, Tokyo (JP)

(73) Assignee: Nec Corporation, Tokyo (JP)

( * ) Notice: Subject to any disclaimer, the term of this patent is extended or adjusted under 35 U.S.C. 154(b) by 1021 days.

(21) Appl. No.: 12/526,244

(22) PCT Filed: Feb. 12, 2008

(86) PCT No.: PCT/JP2008/052243
§ 371 (c)(1),
(2), (4) Date: Aug. 6, 2009

(87) PCT Pub. No.: WO2008/105231
PCT Pub. Date: Sep. 4, 2008

(65) Prior Publication Data
US 2010/0325722 A1    Dec. 23, 2010

(30) Foreign Application Priority Data

Feb. 28, 2007   (JP) ................. 2007-049526

(51) Int. Cl.
*H04L 29/06* (2006.01)
(52) U.S. Cl.
CPC ................. *H04L 63/0876* (2013.01)
USPC .......................... 726/34; 713/193
(58) Field of Classification Search
None
See application file for complete search history.

(56) References Cited

U.S. PATENT DOCUMENTS

| 7,188,358 B1* | 3/2007 | Hisada et al. ............... 726/2 |
| 2003/0033526 A1* | 2/2003 | French et al. ............. 713/168 |
| 2005/0003799 A1* | 1/2005 | Kang ...................... 455/411 |
| 2005/0077997 A1* | 4/2005 | Landram et al. .......... 340/5.54 |
| 2005/0113080 A1* | 5/2005 | Nishimura ............... 455/420 |
| 2006/0230461 A1* | 10/2006 | Hauser .................... 726/27 |
| 2007/0029392 A1* | 2/2007 | Nakatsugawa et al. ..... 235/492 |
| 2007/0271608 A1* | 11/2007 | Shimizu et al. ........... 726/17 |

FOREIGN PATENT DOCUMENTS

| JP | 3-266163 A | 11/1991 |
| JP | 2003006005 A | 1/2003 |
| JP | 2003122443 A | 4/2003 |
| JP | 2006221452 A | 8/2006 |
| WO | 03085528 A | 10/2003 |

OTHER PUBLICATIONS

International Search Report for PCT/JP2008/052243 mailed Mar. 25, 2008.

* cited by examiner

*Primary Examiner* — Venkat Perungavoor

(57) ABSTRACT

The present invention provides an information processing apparatus capable of dynamically changing a security level according to significance of overall data saved in a terminal. A portable telephone terminal 100 includes a lock function to inhibit (allow) use of predetermined functions (part of or all of the functions) of the terminal when a lock-in condition (an unlock condition) is satisfied. The terminal 100 includes a secret level evaluating section 16 for calculating a secret level of the overall apparatus on the basis of scores set respectively to saved data items and a lock-in condition setting section 15 for making, in response to the secret level, the lock-in condition (unlock condition) more mitigated or more severe. Due to the configuration, for example, when significant data is received, the secret level of the overall terminal increases and the lock-in condition (unlock condition) is made more mitigated (more severe).

35 Claims, 4 Drawing Sheets

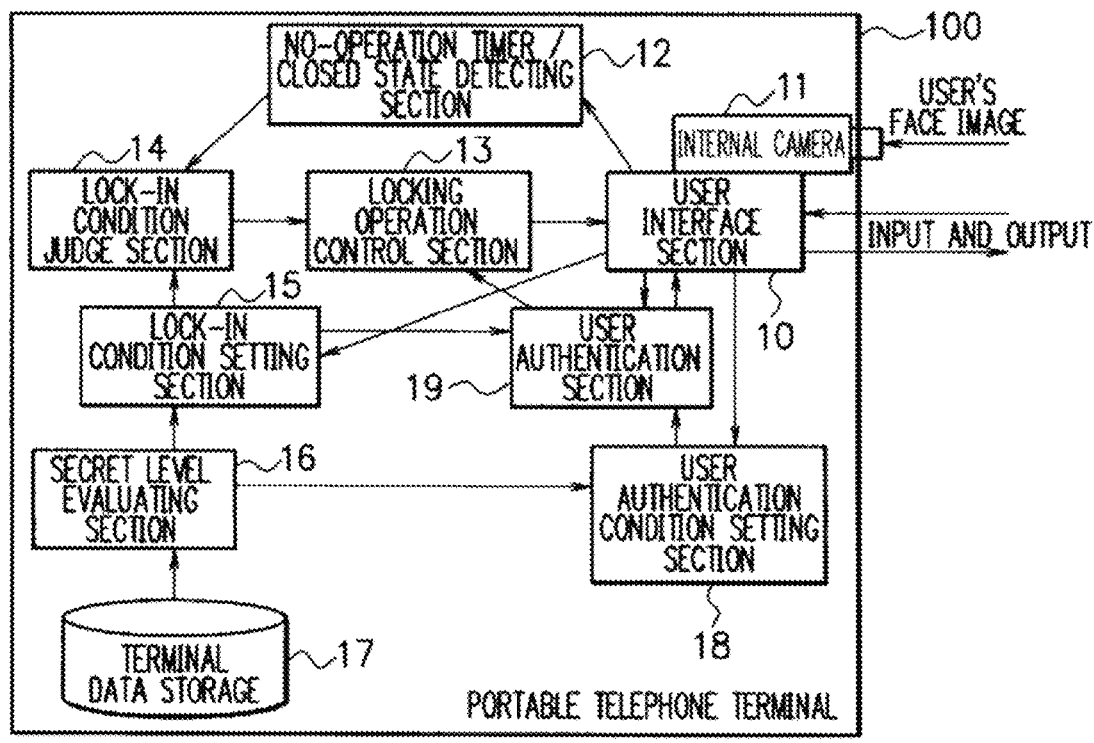

F I G. 3
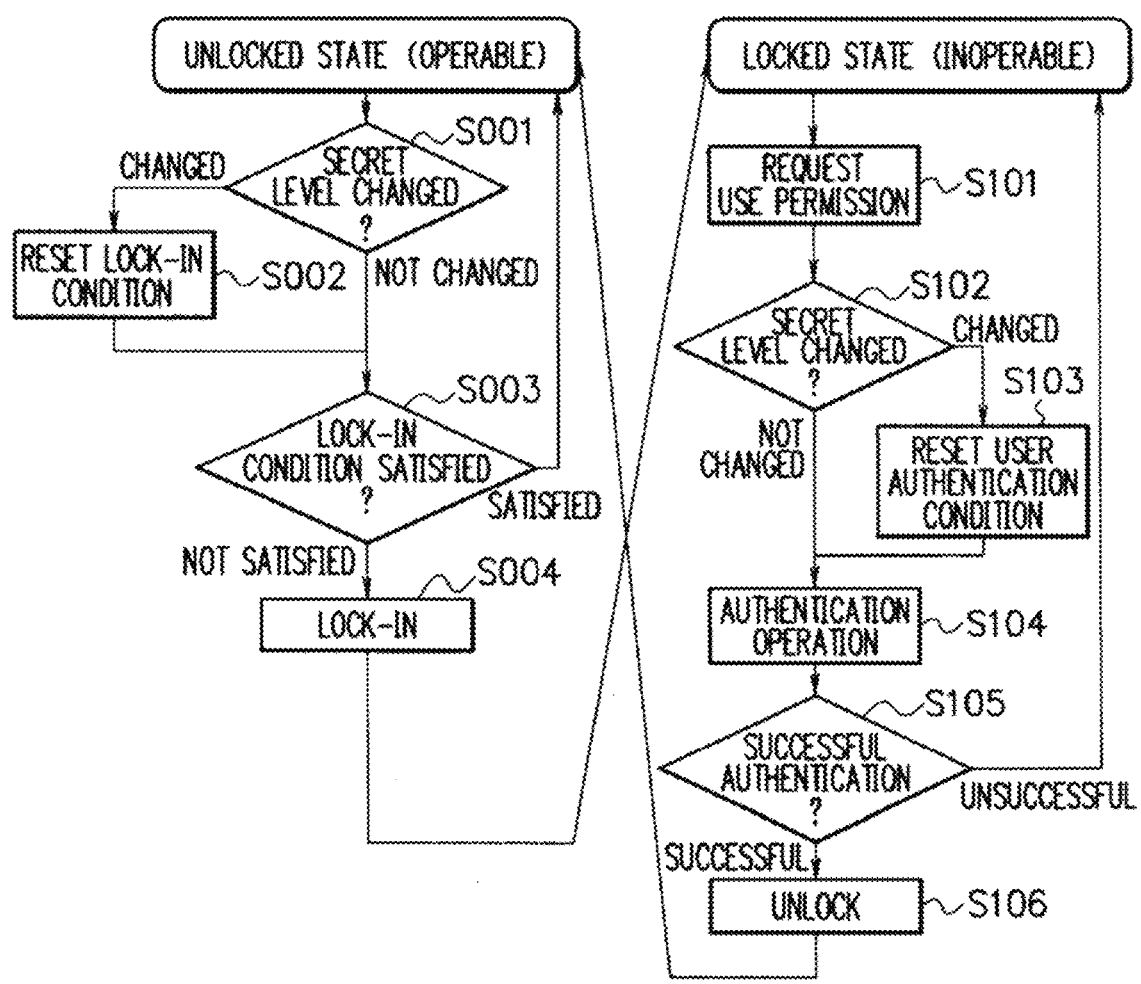

INFORMATION PROCESSING APPARATUS INCLUDING LOCKING FUNCTION, LOCKING (UNLOCKING) METHOD FOR INFORMATION PROCESSING APPARATUS AND PROGRAM THEREOF

This application is the National Phase of PCT/JP2008/052243, filed Feb. 12, 2008, which is based upon and claims the benefit of priority from Japanese patent application No. 2007-049526, filed on Feb. 28, 2007, the disclosure of which is incorporated herein in its entirety by reference.

TECHNICAL FIELD

The present invention relates to an information processing apparatus including a locking function to restrict use of part or all of functions, a method of locking (unlocking) an information processing apparatus, and a program thereof.

BACKGROUND ART

To control access to data in an information processing apparatus to keep internal data secret, a "locking" function to stop part or all of functions in the information processing apparatus has been broadly employed. For example, for a personal computer, there has been known the screen saver which operates a locking function based on a timer.

In a personal information terminal such as a portable telephone (to be referred to as "portable terminal" hereinbelow), a precise locking function is required; for example, Patent Document 1 discloses an electronic apparatus which changes a user authentication method (an authentication processing program) on the basis of the accumulated off time from the previous power-off point of time to the current power-on point of time.

In addition, Patent Document 2 discloses a portable terminal to be employed in combination with an authentication terminal which conducts user authentication through a dialog via a short-distant radio communication function; when a fixed period of time lapses after the last operation, the portable terminal automatically makes a transition to a locked state; and to operate the portable terminal again, user authentication with the authentication terminal is required.

Although being other than a locking function for an information processing apparatus, Patent Document 3 discloses a data storage which assigns a rank to data to be saved according to an significance degree determined on the basis of a type, capacity, an attribute, a creation date, a last access date, a last update date, and the like of data, to thereby save significant data in a storage medium having higher safety.

Patent Document 1: Japanese Patent Laid-Open Pub. No. 2003-122443
Patent Document 2: Japanese Patent Laid-Open Pub. No. 2006-221452
Patent Document 3: Japanese Patent Laid-Open Pub. No. 2003-6005

DISCLOSURE OF THE INVENTION

Problem to be Solved by the Invention

In the related arts described above, on the basis of use (significant information has already been saved/is scheduled to be saved) of the information processing apparatus, it is possible to set a required lock (a lock-in condition to make a transition to a locked state and an unlock condition to make a transition to an unlocked state); however, there exits a problem that this cannot instantaneously correspond to a change in significance of data saved in the information processing apparatus.

For example, even if significant information is saved therein for an e-mail or the like, the unlocking condition is not automatically changed and the user does not recognize that the significant information has been received; if the user forgets to set security, there is set a state wherein security lock is not applied although significant secret data exists therein.

Also, in general, it is likely that when the use period of time is longer, accumulated information items such as a telephone directory, an e-mail transmission and reception history, a schedule, music piece data, and the like increase, and hence the apparatus itself increases in value and significance; however, in the above related arts, it is not possible to cope with such slow increase in value with respect to time.

The present invention has been devised in consideration of the circumstance above and aims to provide an information processing apparatus including a locking function capable of changing easiness of a transition to a locked state and strictness of a return condition to unlocked state on the basis of significance of saved data, a method of locking (unlocking) the information processing apparatus, and a program.

Means for Solving the Problem

In accordance with a first exemplary aspect of the present invention there are provided an information processing apparatus, a locking method thereof, and a program, the information processing apparatus making a transition, when a lock-in condition is satisfied, to a locked state inhibiting use of predetermined functions, characterized by comprising a secret level evaluating section for calculating a secret level of the overall apparatus on the basis of scores set respectively to saved data items; and a lock-in condition setting section for making, in response to the secret level, the lock-in condition more mitigated or more severe.

In accordance with a second exemplary aspect of the present invention there are provided an information processing apparatus, an unlocking method thereof, and a program, the information processing apparatus releasing, in response to successful user authentication, a locked state inhibiting use of predetermined functions, to make a transition to an unlocked state allowing the use of the predetermined functions inhibited as above, characterized by comprising a secret level evaluating section for calculating a secret level of the overall apparatus on the basis of scores set respectively to saved data items; and a user authentication condition setting section for making, in response to the secret level, the user authentication condition more mitigated or more severe.

Advantages of the Invention

In accordance with the present invention, the security level can be changed on the basis of significance of data saved in an information processing apparatus. The reason therefor resides in a configuration wherein based on saved data, a secret level quantitatively representing secrecy for the overall apparatus is calculated such that according to the value thereof, the lock-in condition and the unlock condition (user authentication condition) are made to be more mitigated or more strict.

BEST MODE FOR CARRYING OUT THE INVENTION

[First Exemplary Embodiment]

Subsequently, by referring to drawings, description will be given in detail of a best mode for embodying the present invention. FIG. 1 is a diagram showing structure of a portable telephone terminal in accordance with a first exemplary embodiment of the present invention. Referring to FIG. 1, there is shown a configuration of a portable telephone terminal 100 including an internal camera 11. Assume that the portable telephone terminal 100 is constructed by including two or more housings and can be changed over between an open state and a closed state by use of a hinge, a slide rail, or the like.

A user interface section 10 includes a screen display section, a speaker, various LEDs, a key-in section (keypad), a microphone, and the internal camera 11, and is means to provide an interface for users.

A no-operation timer included in a no-operation timer/closed state detecting section 12 measures a period of time lapsed after the last operation on the key-in section. Also, the closed state detecting section detects whether the portable telephone terminal 100 is closed or opened. Outputs from the no-operation timer and the closed state detecting section are fed to a lock-in condition judge section 14.

The lock-in condition judge section 14 indicates a locking operation to a locking operation control section 13 if an output from the no-operation timer or the closed state detecting section satisfies a beforehand set lock-in condition.

The locking operation control section 13 carries out a predetermined locking operation based on the indication from the lock-in condition judge section 14. It is assumed in this exemplary embodiment that the locking operation control section 13 displays an event of the locked situation on a screen and conducts a locking operation to prevent operation of the terminal and access to the internal data.

A lock-in condition setting section 15 is means to set a lock-in condition for use in the lock-in condition judge section 14. In this exemplary embodiment, the lock-in condition setting section 15 functions as means to receive a lock-in condition via the user interface section 10 from the user and means to change the contents set as a lock-in condition on the basis of a change in the secret level delivered from a secret level evaluation section 16.

The lock-in condition setting section 15 basically sets, if the secret level is high, the lock-in condition to a lower value such that the system easily makes a transition to a locked state and sets, if the secret level is low, the lock-in condition to a higher value such that the system cannot easily make a transition to a locked state.

The secret level evaluation section 16 refers to a terminal data storage 17, which saves data in the portable telephone terminal 100, and quantitatively evaluates, by use of a secrecy score set to each data item, secrecy of the entire data saved therein to calculate a secret level of the portable telephone terminal 100.

A user authentication condition setting section 18 is means to set a user authentication condition to be employed in a user authentication section 19. In this exemplary embodiment, the user authentication condition setting section 18 functions as means to receive a user authentication condition via the user interface section 10 from the user and means to change the contents set as a user authentication condition according to the change in the secret level delivered from the secret level evaluation section 16.

The user authentication condition setting section 18 basically sets, if the secret level is high, a user authentication condition by more complicated and higher user authentication means, and sets, if the secret level is low, a user authentication condition by relatively simple and easy user authentication means.

The user authentication section 19 is means to conduct an input or output operation on the basis of the contents set by the user authentication condition setting section 18 to thereby carry out user authentication. Further, if the user authentication is unsuccessfully finished, the user authentication section 19 indicates a locking operation to the locking operation control section 13.

FIG. 2 is a diagram schematically showing data saved in the terminal data storage 17. Referring to FIG. 2, for each internal data unit, there is provided a secrecy score indicating significance and secrecy requirement. The secrecy score is inputted by the user; alternatively, for example, for e-mails, it is possible to use significance information set by a transmission source.

For example, in the example of FIG. 2, an e-mail received from Division. Manager B, a document file including personnel information, and the like are assumed as data items having high secrecy and hence are assigned with higher secrecy scores ("5", "8"). Contrarily, a saved web page, schedule table data, and the like are regarded as data items having relatively lower secrecy and are accordingly assigned with lower secrecy scores ("0", "1"). Based on the sum of secrecy scores assigned to these data items currently in the portable telephone terminal 100, there is calculated a secret level representing degree of requirement for secrecy of the portable telephone terminal 100 on the basis of data.

Meanwhile, in conjunction with the example of FIG. 2, description has been given by assuming that the secrecy score is assigned in each data unit; however, by beforehand determining a significance coefficient for each data type, the secrecy score may be calculated by multiplying the coefficient by a data size. For example, by setting coefficients ranging from 0 to 1 to data items less associated with privacy such as the music piece data and the saved web page and coefficients equal to or more than one to the telephone directory and the camera image, it is possible to attain the degree of requirement for secrecy of the overall portable telephone terminal 100.

Next, referring to the flowchart of FIG. 3, description will be given of operation of the portable telephone terminal 100 in accordance with the present exemplary embodiment. Here, description will be given on assumption that the portable telephone terminal 100 is being employed by the user, i.e., in the unlocked state.

First, during the unlocked state, the secret level evaluation section 16 sums up the current secrecy score of the terminal data storage 17 with a predetermined period (e.g., n second interval for a short-period type) to calculate the secret level. The lock-in condition setting section 15 judges whether or not the secret level calculated by the secret level evaluation section 16 is other than the previously received value, namely, whether or not the secret level has changed (step S001).

Here, if the secret level has changed ("changed" in step S001), the lock-in condition setting section 15 resets the lock-in condition (step S002).

The lock-in condition setting section 15 changes (resets) the lock-in condition, for example, as below according to the changed secret level.

(Secret level is more than 200: high security mode)
Lock-in condition: Make a transition to the locked state if the portable telephone terminal is closed or if the no-operation state continues one minute.
(Secret Level is More than 100: Middle Security Mode)
Lock-in condition: Make a transition to the locked state if the portable telephone terminal is closed or if the no-operation state continues three minutes.
(Secret Level is Equal to or Less than 100: Normal Mode)
Lock-in condition: Make a transition to the locked state if the no-operation state continues five minutes.

In the above example, according to the secret level attained by the secret level evaluation section 16, a lock-in condition suitable for the requirement is selected.

Subsequently, based on an input such as the time lapsed from the last operation on the key-in section or whether or not the portable telephone terminal 100 is in the closed state, the lock-in condition judge section 14 judges whether or not the lock-in condition set by the lock-in condition setting section 15 is satisfied (step S003). Here, so long as it is judged that the lock-in condition is not satisfied, the unlocked state continues ("not satisfied" in step S003).

On the other hand, if it is judged that the lock-in condition is satisfied ("satisfied" in step S003), the lock-in condition judge section 14 indicates a lock-in operation to the lock operation control section 13 and the system enters the locked state (step S004).

In the locked state, to use the portable telephone terminal, if the user depresses a predetermined key or sets the portable telephone terminal 100 to the open state (step S101), the secret level evaluation section 16 calculates the secret level and the lock-in condition setting section 15 judges whether or not the secret level has changed, before the authentication operation by the user authentication section 19 (step S102).

Here, if the secret level has changed ("changed" in step S102), the user authentication condition setting section 18 resets the user authentication condition (step S103).

The user authentication condition setting section 18 changes (resets) the user authentication condition, for example, as below based on the changed secret level.
(Secret Level is More than 200: High Security Mode)
User authentication condition: Face authentication is successfully completed and an input of a first identification number including at least six positions matches.
(Secret Level is More than 100: Middle Security Mode)
User authentication condition: Face authentication is successfully completed and an input of a second identification number including at least four positions matches.
(Secret Level is Equal to or Less than 100: Normal Mode)
User authentication condition: An input of a second identification number including at least four positions matches.

In the example described above, according to the secret level obtained by the secret level evaluation section 16, at least one unit of user authentication means suitable for its requirement is selected.

Next, according to the authentication condition set as above by the user authentication section 19, "Please, input identification number" or "Please, look at camera" is displayed on the screen (step S104); based on the input contents, whether or not the user authentication condition is satisfied is judged (step S105). Here, if the user authentication is unsuccessfully finished ("unsuccessful" in step S105), the locked state continues.

On the other hand, if the user authentication is successfully finished (successful" in step S105), the user authentication section 19 indicates the release of lock to the locking operation control section 13, and the system enters the unlocked state (step S106).

As above, in the portable telephone terminal in accordance with the present exemplary embodiment, the security level can be increased or decreased according to significance of the saved data. For example, when significant data is saved, by assigning a high significance score, the user can set a lock-in condition such that a transition to the locked state easily occurs indirectly; when the data is deleted, the user can restore the lock-in condition.

Further, in the portable telephone terminal 100 in accordance with the present exemplary embodiment, a received e-mail is also used as an factor to calculate a secret score; for example, when the portable telephone terminal 100 is lost, by transmitting an e-mail to which high significance is set, from a second terminal or the like, it is possible to conduct a remote operation to set the portable telephone terminal 100 to a state in which the portable telephone terminal 100 is easily locked.

[Second Exemplary Embodiment]

Next, description will be given of a second exemplary embodiment of the present invention implemented by adding several functions to the first exemplary embodiment.

The above first exemplary embodiment employs, in consideration of usability for the user, a lock-in condition in which a transition to the locked state takes place "if the portable telephone terminal is closed or if the period of time in which the user does not conduct key-in operation continues n minutes"; in this case, however, if the user carelessly leaves the portable telephone terminal opened on the desk and a second person steals the terminal before the lapse of n minutes and starts illegally using it, there arises a problem that the second person can thereafter arbitrarily use the terminal.

In this situation, the present exemplary embodiment additionally includes a function to periodically judge, even when the key-in operation is continuously conducted, whether or not the locking operation is to be carried out.

FIG. 4 is a diagram showing structure of a portable telephone terminal in accordance with the second exemplary embodiment of the present invention. This differs from the portable telephone terminal 100 in accordance with the first exemplary embodiment in that an intermittent authentication activating section 20 and an intermittent authentication condition setting section 21 are additionally included. Next, description will be given mainly of these different points.

The intermittent authentication activating section 20 instructs, even in a situation wherein the user is operating in the unlocked state, the user authentication section 19 to carry out user authentication if it is confirmed that the condition set by the intermittent authentication condition setting section 21 is satisfied.

If the user authentication is successfully completed by the user authentication section 19, the unlocked state continues; if the user authentication is unsuccessfully completed, a transition to the locked state immediately takes place.

The intermittent authentication condition setting section 21 is means to set an intermittent authentication condition to be used by the intermittent authentication activating section 20. In this exemplary embodiment, the intermittent authentication condition setting section 21 functions as means to receive an intermittent authentication condition via the user interface section 10 from the user and means to change the contents set as the intermittent authentication condition in accordance with the change in the secret level produced from the secret level evaluation section 16.

The intermittent authentication condition dynamically changes, like the lock-in condition and the user authentication condition above, according to the secret level of the portable telephone terminal 100.

The intermittent authentication condition setting section 21 basically sets, if the secret level is high, the intermittent authentication condition to conduct the user authentication more frequently and sets, if the secret level is low, the intermittent authentication condition to conduct the user authentication at a longer interval of time.

The intermittent authentication condition is changed (reset), for example, as below according to the secret level.
(Secret level is more than 200: high security mode)
Intermittent authentication condition: Request face authentication (high precision) and identification number input at three-minute interval.
(Secret level is more than 100: middle security mode)
Intermittent authentication condition: Request face authentication (low precision) and identification number input at ten-minute interval.
(Secret level is equal to or less than 100: normal mode)
Intermittent authentication condition: Do not conduct intermittent authentication.

Subsequently, referring to the flowchart of FIG. 5, description will be given of operation of the portable telephone terminal 100 in accordance with the present exemplary embodiment. Here, description will be given on assumption that the portable telephone terminal 100 is being used by the user, i.e., in the unlocked state.

First, during the unlocked state, the secret level evaluation section 16 sums up the current secrecy score of the terminal data storage 17 with a predetermined period (e.g., n second interval for a short-period type) to calculate the secret level. The lock-in condition setting section 15 judges whether or not the secret level calculated by the secret level evaluation section 16 is other than the previously received value, namely, the secret level has changed (step S201).

Here, if the secret level has changed ("changed" in step S201), the lock-in condition setting section 15, the intermittent authentication condition setting section 21, and the user authentication condition setting section 18 respectively reset the lock-in condition, the intermittent authentication condition, and the user authentication condition (step S202).

Subsequently, based on an input such as the time lapsed from the last operation on the key-in section or whether or not the terminal 100 is in the closed state, the lock-in condition judge section 14 judges whether or not the lock-in condition set by the lock-in condition setting section 15 is satisfied (step S203). Here, operation after it is judged that the lock-in condition is satisfied (steps S204 and S101 to S106) is similar to that of the first exemplary embodiment described above and hence will not be described.

On the other hand, if it is judged in step S203 that the lock-in condition is not satisfied, the unlocked state basically continues; however, the intermittent authentication activating section 20 carries out user authentication based on the intermittent authentication condition (steps S205 to S207).

If the authentication fails in the intermittent authentication, an indication of a locking operation is delivered to the locking operation control section 13, and a transition to the locked state immediately takes place ("unsuccessful" in step S207).

As above, if it is assumed in the present exemplary embodiment that "if the portable telephone terminal is closed or if the user does not conduct key-in operation for 5 minutes" is set as the lock-in condition, it is possible to prevent occurrence of a case wherein if the user carelessly leaves the portable telephone terminal opened on the desk and a second person steals the terminal after four minutes and starts illegally using it, the second person can thereafter arbitrarily use the terminal.

As above, description has been given of favorable exemplary embodiments of the present invention; however, various variations thereof are possible without departing from the gist of the present invention in which significance (secrecy) of the entire data saved in an information processing apparatus is estimated to reflect it in the condition of the locking and unlocking operations. For example, in conjunction with the above exemplary embodiments, description has been given of an example of application to a portable telephone terminal; however, it goes without saying that the present invention is applicable to other information processing apparatuses which are employed to save data therein such as a personal computer, a Personal Digital Assistant (PDA), a digital camera, a portable music player, and various storage devices.

Further, for the exemplary embodiments, description has been given on assumption that the confirmation of the change in the secret level and the intermittent authentication are carried out at a fixed interval of time; however, the confirmation of the change in the secret level and the intermittent authentication may also be carried out at occurrence of a particular event such as an operation to refer to an address book, transmission or reception of a voice call; mail creation, transmission, or reception; data input or output for an external device, execution of an application, or update of a schedule table; update, addition, or deletion of internal data; or execution of a new task, or switching between tasks.

By employing the confirmation of the changes in the secret level on the basis of two or more events described above, it is possible to elongate the interval between the operation for the confirmation of the change in the secret level or the intermittent authentication to thereby achieve the saving of computation power and power consumption.

Moreover, in conjunction with the exemplary embodiments, description has been given on assumption that the locking operation always displays on the screen a message indicating the locked state, and the operation of the terminals and access to the internal data are not possible; however, if the secret level is equal to or less than a fixed level, it is also possible to allow use of functions within a fixed range. Further, contrarily, if the secret level is equal to or more than a fixed level, it is also possible to inhibit the operation to open the terminal (to open by use of the hinge, to open by slide-opening).

Additionally, for the exemplary embodiments, description has been given on assumption that the face image authentication is carried out by use of the internal camera; however, it is possible to adopt a user authentication scheme in which according to the secret level, other biometrics information items such as the voice, the iris, finger prints, and a venous image are used, specifically, as a single item thereof or a combination thereof. Further, in a situation where higher security is desired even if only one unit of authentication information input means is present, it is possible to carry out severe user authentication by using a higher-precision scheme; in other cases, simple user authentication can be conducted by use of a scheme including a smaller amount of calculations.

BRIEF DESCRIPTION OF DRAWINGS

[FIG. 1] is a diagram showing a configuration of a portable telephone terminal in accordance with a first exemplary embodiment of the present invention.

[FIG. 2] is a diagram schematically showing data to be saved in a terminal data storage.

[FIG. 3] is a diagram to explain operation of the portable telephone terminal in accordance with the first exemplary embodiment of the present invention.

DESCRIPTION OF REFERENCE NUMERALS

Figure 4:
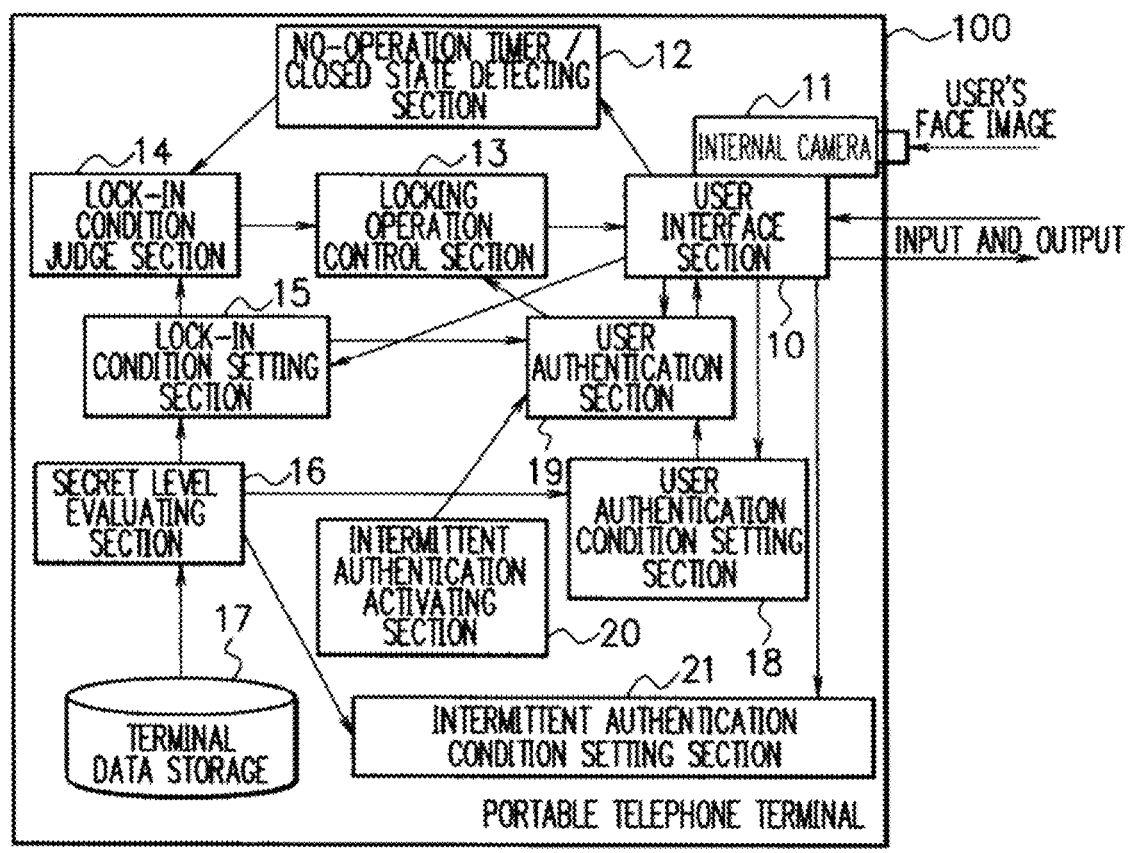
[FIG. 4] is diagram showing a configuration of a portable telephone terminal in accordance with a second exemplary embodiment of the present invention.
Figure 5:
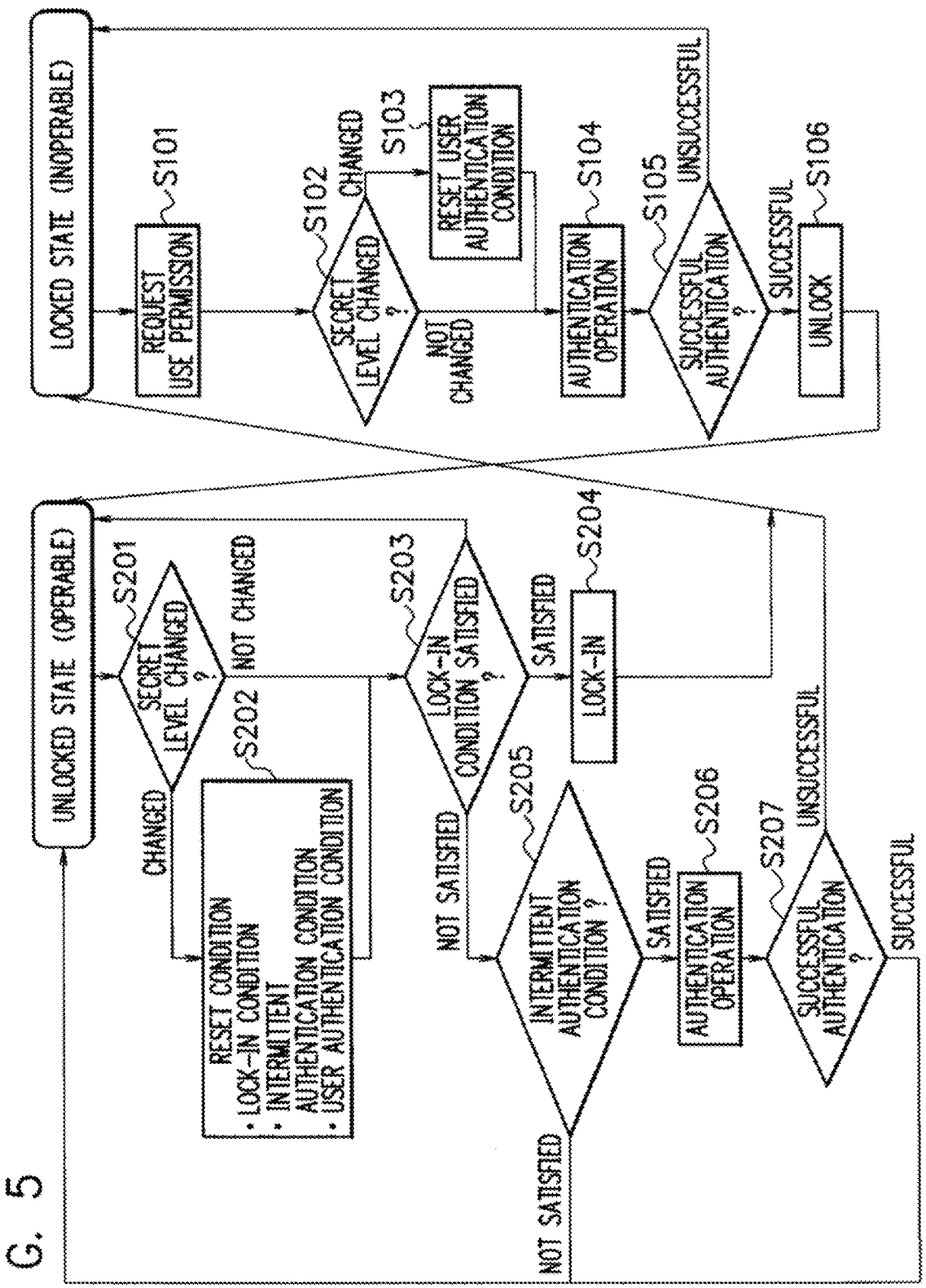
[FIG. 5] is a diagram to explain operation of the portable telephone terminal in accordance with the second exemplary embodiment of the present invention.

10 User interface section
11 Internal camera
12 No-operation timer/closed state detecting section
13 Locking operation control section
14 Lock-in condition judge section
15 Lock-in condition setting section
16 Secret level evaluation section
17 Terminal data storage
18 User authentication condition setting section
19 User authentication section
20 Intermittent authentication activating section
21 Intermittent authentication condition setting section
100 Portable telephone terminal

The invention claimed is:

1. An information processing apparatus which locks a function of being a locking target when a lock-in condition is satisfied, comprising:
a storage unit that is able to store data related to a score indicating a secret degree of the data;
a secret level evaluating section that calculates a secret level about the overall apparatus based on the score related to the data stored in the storage unit; and
a lock-in condition setting section that modifies the lock-in condition according to the calculated secret level.

2. The information processing apparatus in accordance with claim 1, wherein
the secret level evaluating section employs, as the score, a significance flag accompanied in an e-mail being the data.

3. The information processing apparatus in accordance with claim 1, wherein
the secret level evaluating section calculates the score about each data by multiplying a significance coefficient depending on each data type by a data size.

4. The information processing apparatus in accordance with claim 1, wherein
the secret level evaluating section calculates the secret level about the overall apparatus based on the sum of the scores.

5. The information processing apparatus in accordance with claim 1, wherein
the lock-in condition setting section modifies the lock-in condition according to a length of no-operation period.

6. The information processing apparatus in accordance with claim 1, wherein
even in an unlocked state, the secret level evaluating section calculates the secret level and the lock-in condition setting section modifies the lock-in condition at a predetermined interval of time.

7. The information processing apparatus in accordance with claim 1, wherein
even in an unlocked state, if data update, saving, or deletion is carried out, the secret level evaluating section calculates the secret level and the lock-in condition setting section modifies the lock-in condition.

8. The information processing apparatus in accordance with claim 1, further comprising:
a user authentication condition setting section that modifies a user authentication condition according to the calculated secret level; and
a user authentication section that authenticates a user according to the user authentication condition and, changes the locked state to the unlocked state if the user authentication is successfully finished.

9. The information processing apparatus in accordance with claim 8, wherein
the user authentication condition setting section modifies the user authentication condition according to changing authentication information in which the user authentication section requests a user to input.

10. The information processing apparatus in accordance with claim 9, wherein
the authentication information includes one of or both of a first password and a second password longer than the first password.

11. The information processing apparatus in accordance with claim 8, wherein
the user authentication condition setting section modifies the user authentication condition according to changing of a type of biometrics information being the authentication information and an authentication success judge criterion on basis of the biometrics information.

12. The information processing apparatus in accordance with claim 9, wherein
even in a locked state, the secret level evaluating section calculates the secret level and the lock-in condition setting section modifies the lock-in condition.

13. The information processing apparatus in accordance with claim 9, wherein
even in an unlocked state, if data update, saving, or deletion is carried out, the secret level evaluating section calculates the secret level and the lock-in condition setting section modifies the lock-in condition.

14. The information processing apparatus in accordance with claim 9, further comprising
an intermittent authentication activating section that operates, even in an unlocked state, the user authentication section at a predetermined interval of time.

15. The information processing apparatus in accordance with claim 9, wherein
the user authentication section carries out user authentication based on a user's face image inputted from a camera.

16. The information processing apparatus in accordance with claim 14, further comprising
an intermittent authentication condition setting section that changes according to the secret level, an operation cycle of the intermittent authentication activating section.

17. The information processing apparatus in accordance with claim 14, wherein
the intermittent authentication activating section operates the user authentication section also when predetermined operation is carried out.

18. The information processing apparatus in accordance with claim 14, wherein
the intermittent authentication activating section operates the user authentication section also when a new task is activated or a task switching operation is conducted.

19. An information processing apparatus which releases a lock state locking a function of being a locking target when a user authentication condition is satisfied, comprising:

a storage unit that is able to store data related to a score indicating a secret degree of the data;

a secret level evaluating section that calculates a secret level about the overall apparatus based on the score related to the data stored in the storage unit; and a user authentication condition setting section that modifies the user authentication condition according to the calculated secret level.

20. The information processing apparatus in accordance with claim 19, wherein the secret level evaluating section employs, as the score, a significance flag accompanied in an e-mail being the data.

21. The information processing apparatus in accordance with claim 19, wherein the secret level evaluating section calculates the score about each data by multiplying a significance coefficient depending on each data type by a data size.

22. The information processing apparatus in accordance with claim 19, wherein the secret level evaluating section calculates the secret level about the overall apparatus based on the sum of the scores.

23. The information processing apparatus in accordance with claim 19, wherein the user authentication condition setting section modifies the user authentication condition according to changing authentication information in which the user authentication section requests a user to input.

24. The information processing apparatus in accordance with claim 23, wherein the authentication information includes one of or both of a first password and a second password longer than the first password.

25. The information processing apparatus in accordance with claim 19, wherein the user authentication condition setting section modifies the user authentication condition according to changing of a type of biometrics information being the authentication information and an authentication success judge criterion on the basis of the biometrics information.

26. The information processing apparatus in accordance with claim 19, wherein even in a locked state, the secret level evaluating section calculates the secret level and the lock-in condition setting section modifies the lock-in condition.

27. The information processing apparatus in accordance with claim 19, wherein even in an unlocked state, if data update, saving, or deletion is carried out, the secret level evaluating section calculates the secret level and the lock-in condition setting section modifies the lock-in condition.

28. The information processing apparatus in accordance with claim 19, further comprising an intermittent authentication activating section that operates, even in an unlocked state, the user authentication section at a predetermined interval of time.

29. The information processing apparatus in accordance with claim 19, wherein the user authentication section carries out user authentication based on a user's face image inputted from a camera.

30. The information processing apparatus in accordance with claim 28, wherein the intermittent authentication activating section operates the user authentication section also when predetermined operation is carried out.

31. The information processing apparatus in accordance with claim 28, wherein the intermittent authentication activating section operates the user authentication section also when a new task is activated or a task switching operation is conducted.

32. A computer-implemented method of locking a function of being a locking target in an information processing apparatus, comprising:

calculating a secret level about the information processing apparatus based on a score indicating a secret degree of data stored in the information processing apparatus;

modifying a lock-in condition according to the calculated secret level; and locking the function of being a locking target when a lock-in condition is satisfied.

33. A computer-implemented method of unlocking a function locked in an information processing apparatus, comprising:

calculating a secret level about the information processing apparatus based on a score indicating a secret degree of data stored in the information processing apparatus;

modifying a user authentication condition according to the calculated secret level; and authenticating a user according to the user authentication condition and changing a locked state to an unlocked state if the user authentication is successfully finished.

34. A non-transitory storing medium for storing program for locking a function of being a locking target in an information processing apparatus making the apparatus execute:

calculating a secret level about the information processing apparatus based on a score indicating a secret degree of data stored in the information processing apparatus items;

modifying a lock-in condition according to the calculated secret level, and locking the function of being a locking target when a lock-in condition is satisfied.

35. A non-transitory storing medium for storing a program for unlocking a function locked in an information processing making the apparatus execute:

calculating a secret level about the information processing apparatus based on a score indicating a secret degree of data stored in the information processing apparatus items;

modifying a user authentication condition according to the calculated secret level, and authenticating a user according to the user authentication condition and changing a locked state to an unlocked state if the user authentication is successfully finished.

* * * * *